United States Patent
Hirayama

(10) Patent No.: US 6,318,082 B1
(45) Date of Patent: Nov. 20, 2001

(54) MASTER CYLINDER

(75) Inventor: Junichi Hirayama, Higashimatsuyama (JP)

(73) Assignee: Bosch Braking Systems Co., Ltd., Tokyo (JP)

( * ) Notice: Subject to any disclaimer, the term of this patent is extended or adjusted under 35 U.S.C. 154(b) by 0 days.

(21) Appl. No.: 09/441,562

(22) Filed: Nov. 17, 1999

(30) Foreign Application Priority Data

Nov. 17, 1998 (JP) .................................. 10-326205

(51) Int. Cl.[7] .................................................. B60T 11/18
(52) U.S. Cl. .................................................. 60/588
(58) Field of Search ................................ 60/588, 592

(56) References Cited

U.S. PATENT DOCUMENTS

| | | | | |
|---|---|---|---|---|
| 3,593,267 | * | 7/1971 | Klein | 60/545 X |
| 4,745,751 | * | 5/1988 | Gaiser | 60/578 |
| 4,939,901 | * | 7/1990 | Saalbach et al. | 60/589 X |
| 5,878,575 | * | 3/1999 | Kreh et al. | 60/562 |

* cited by examiner

*Primary Examiner*—John E. Ryznic
(74) *Attorney, Agent, or Firm*—Alston & Bird LLP

(57) ABSTRACT

An object of the present invention is to reduce the work cost of a piston, and to decrease the resistance of flow in a communicating passage between a pressure chamber and a reservoir, and to reduce the ineffective stroke, too, and the means is as flows: a small outside diameter portion (28) whose outside diameter is reduced by forming a step surface (27) on the periphery of a piston (24) and a sleeve (30) to be fitted onto the periphery of the small outside diameter portion (28) are provided; and a radial passage groove (32) formed along the radial direction between the step surface (27) and the end surface of the sleeve (30) opposite to the step surface (27) and an axial passage groove (33) formed along a direction crossing the radial passage groove (32) between the inner surface of the sleeve (30) and the peripheral surface of the small outside diameter portion (28) are provided; and the radial passage groove (32) and the axial passage groove (33) are used as a communicating hole. Then, the size of continuous length in the circumferential direction of the radial passage groove (32) is set larger and the size of depth of the axial passage groove (33) is set smaller than the size of a step of the step surface (27).

6 Claims, 5 Drawing Sheets

MASTER CYLINDER

FIELD OF THE INVENTION AND RELATED ART

The present invention relates to a master cylinder, and it is suitable for the use in a clutch actuating device, a braking device, or the like of an automobile.

FIG. 5 is a longitudinal sectional view showing a master cylinder relating to the present invention. In this master cylinder 1, a primary pressure chamber 6 and a secondary pressure chamber 7 are configured by a freely slidable primary piston 4 and a freely slidable secondary piston 5 In a cylinder hole 3 of a cylinder housing 2. In the cylinder housing 2, connecting passages 8, 9 are pieced at side wall portions corresponding to the respective pistons 4, 5. The respective connecting passages 8, 9 are open at the inner surface of the cylinder housing 2, and near the opening portions, cup seals 10, 11 are fitted, and by the cup seals 10, 11, the opening portions are sealed. In the respective pistons 4, 5, a plurality of communicating holes 12, 13 arranged in the circumferential direction are pieced along the radial direction. Both pressure chambers 6, 7 are connected to two lines of oil hydraulic circuits in an automobile through the respective ports 14, 15.

Both pistons 4, 5 are urged to the right in the figure by return springs 16, 17 respectively; and to the rear end portion of the primary piston 4, an unillustrated push rod is connected. Then, during the operation, when the pistons 4, 5 advance and move to the left so that the communicating holes 12, 13 may pass the cup seals 10, 11, pressure is created in the pressure chambers 6, 7. The initial portion of the strokes of the pistons 4, 5 until this pressure is created are ineffective. Accordingly, it is preferable that sizes of the communicating holes 12, 13 measured along the axial direction of the cylinder housing 2 are as short as possible. For that, it is necessary to decrease diameters of the holes. During the return stroke, when the pistons 4, 5 move to the right so that the communicating holes 12, 13 may pass the cup seals 10, 11, the pressure chambers 6, 7 are refilled with liquid oil from an unillustrated overhead reservoir. Accordingly, it is preferable that the resistance of flow of the communicating holes 12, 13 is as small as possible. For that, it is necessary to enlarge the diameters of the communicating holes 12, 13, or to increase the number of the holes.

However, in the above master cylinder 1, the communicating holes 12, 13 are pierced in the radial direction with respect to the pistons 4, 5, and it is impossible to deal with the situation only by enlarging the diameters of the communicating holes 12, 13, since the ineffective portion of the piston strokes are thereby enlarged. Alternatively, if the number of communicating holes 12, 13 is increased, the time and labor for perforating or deburring during the perforating, are increased so that the cost may be raised, and therefore, there is a limit in increasing the number of holes further and if variations in the position of a plurality of holes are caused in the axial direction, the ineffective portion of the piston strokes becomes larger. In order to prevent this, it is necessary to improve the accuracy in the work, and there has been a problem of raising of the cost.

OBJECT AND SUMMARY OF THE INVENTION

In order to solve the above problems, it is an object of the present invention to provide a master cylinder, wherein the processing of a communicating hole of a piston becomes unnecessary and the manufacturing cost of a piston can be reduced, and/or wherein, the resistance of flow in the communicating passage between the pressure chamber and the reservoir can be reduced and the ineffective portion of the stroke can also be reduced.

In order to achieve the objective, the present invention provides a master cylinder comprising a cylinder housing which has a connecting passage connected to a reservoir, and a piston which is freely slidable in a cylinder hole of the cylinder housing, the piston configuring a pressure chamber. The pressure chamber and the reservoir communicate through the connecting passage and a communicating hole provided on the piston exterior. The piston includes reduced outside diameter portion formed by a radially inward step surface on the periphery of the piston. A sleeve is fitted onto the periphery of the reduced outside diameter portion of the piston. A radial passage groove is formed between a radial portion of the step surface and an end surface of the sleeve opposite to the step surface and, and an axial passage groove which exists between an inner surface of the sleeve and a peripheral surface of the reduced outside diameter portion of the piston and intersects the radial passage groove so that the communicating hole is by defined the radial passage groove and the axial passage groove.

Furthermore, in the present invention, the size of the continuous length in the circumferential direction of the radial passage groove is preferably larger than the depth of the axial passage groove is preferably smaller than, the radial size, i.e., the size of the step of the step surface.

The present invention has the following effects.

That is, since the present invention is composed as mentioned above, the processing of a communicating hole of the piston becomes unnecessary and the work cost of the piston can be reduced, and further, the resistance of flow in the communicating passage between the pressure chamber and the reservoir is reduced and the ineffective stroke length can also be reduced. Furthermore, since the size of the continuous length in the circumferential direction of the radial passage groove is set larger and the size of the depth of the axial passage groove is set smaller than the size of the step of the step surface, the sectional area of the passage of the communicating hole is held and the resistance of flow of the passage can be reduced.

DETAILED DESCRIPTION OF PREFERRED EMBODIMENTS

Embodiments of the present invention will be described below In detail by referring to drawings.

Figure 1:
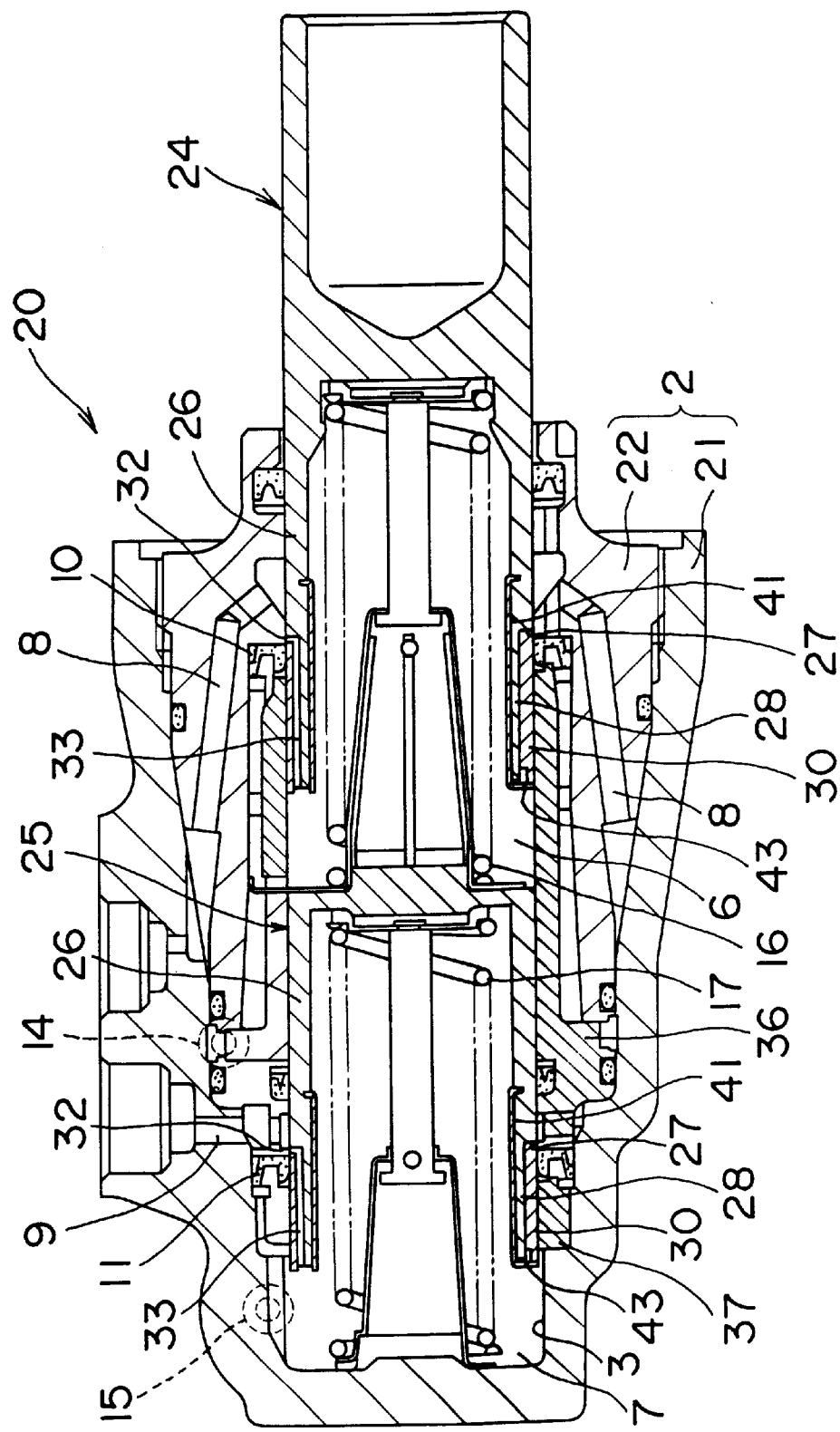
FIG. 1 is a longitudinal sectional view showing a master cylinder according to an embodiment of the present invention.
Figure 2:
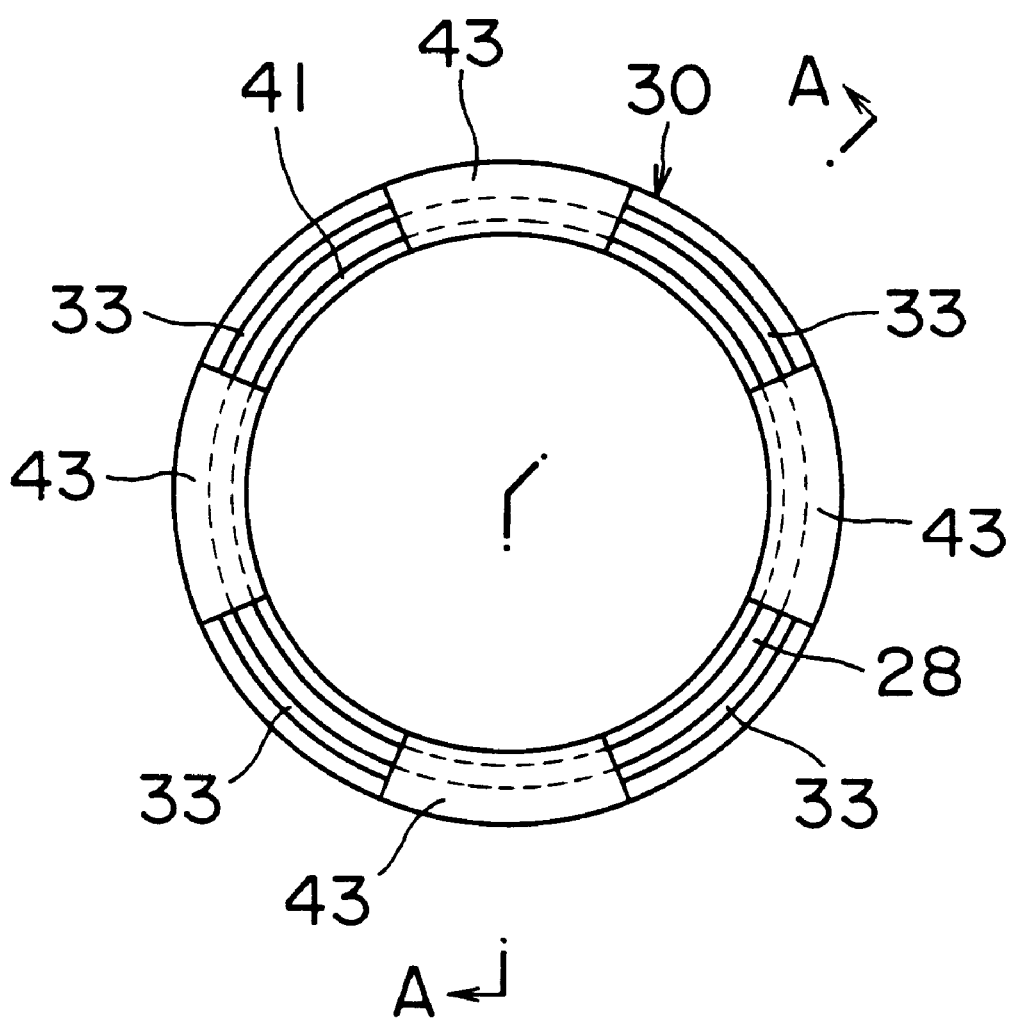
FIG. 2 is an enlarged front view of the main portion showing the enlarged main portion of FIG. 1.
Figure 3:
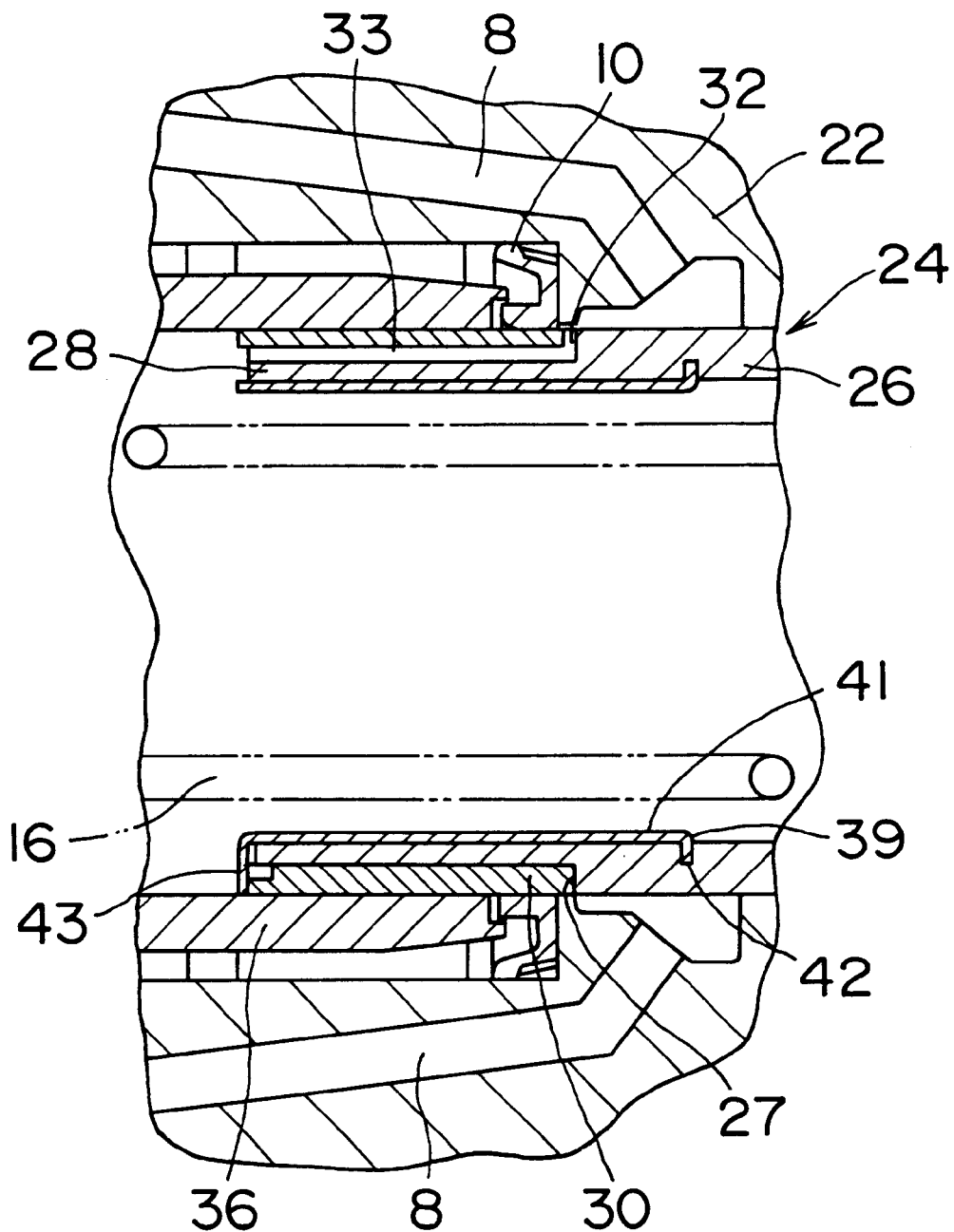
FIG. 3 is a cross sectional view taken along the line A—A of FIG. 2.
Figure 5:
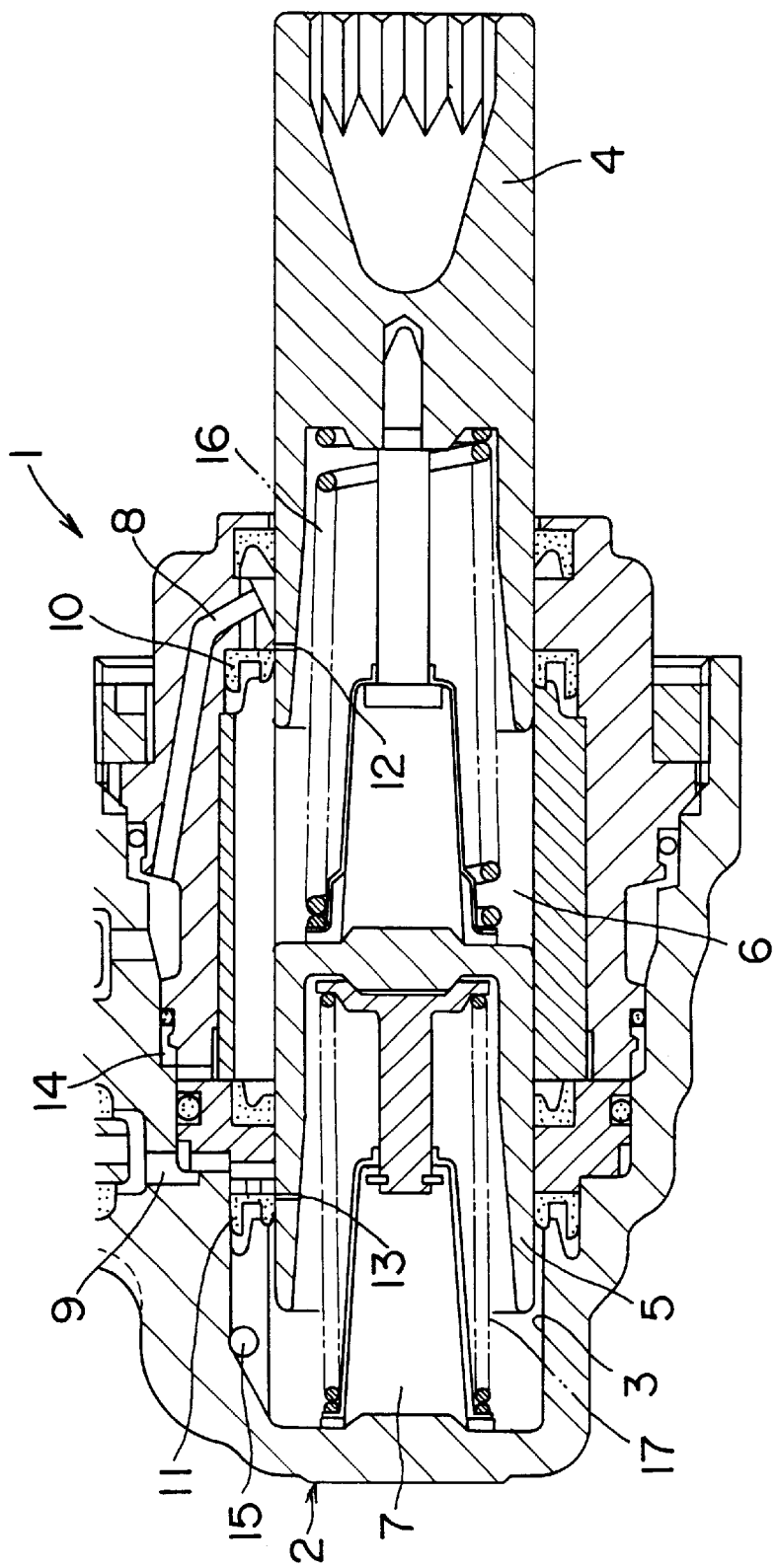
FIG. 5 is a longitudinal sectional view showing conventional a master cylinder relating to the present invention.

FIG. 1 is a longitudinal sectional view showing a master cylinder according to one embodiment of the present invention, and FIG. 2 is an enlarged front view of the main portion showing the enlarged main portion of FIG. 1, and FIG. 3 is a cross sectional view taken along the line A—A of FIG. 2, and the same reference numerals are given to the parts which are equal to or are corresponding to those of the master cylinder shown in FIG. 5, and the description thereof is omitted. Similar to the above master cylinder 1 shown in FIG. 5, this master cylinder has a primary pressure chamber 6 and a secondary pressure chamber 7 which are configured by a freely slidable primary piston 24 and a freely slidable secondary piston 25 in a cylinder hole 3 of a cylinder housing 2, and in the cylinder housing 2, connecting passages 8, 9 are pieced at side wall portions corresponding to the respective pistons 24, 25. Both pressure chambers 6, 7 are connected to two lines of oil hydraulic circuits in an automobile through the respective ports 14, 15.

Furthermore, in this master cylinder 20, small outside diameter portions 28 of the pistons 24 and 25 whose outside diameter is reduced by forming a step surface 27 on the periphery of each of the pistons 24, 25 and sleeves 30 fitted onto the periphery of the small outside diameter portions 28 are provided. Each sleeve 30, defines a radial passage groove 32 in a space which exists at the end surface thereof opposite to the step surface 27 of the piston along the radial direction thereof. An axial passage groove 33 exists on the inner surface side of sleeve 30 and is formed along the axial direction intersecting the radial passage groove 32. The radial passage groove 32 and the axial passage groove 33 are used as the communicating hole.

The cylinder housing 2 is composed such that a second housing block 22 is inserted from the opening side of a first housing block 21 into the first housing block 21 to form a combination, and by the first housing block 21 and the second housing block 22, a cylinder hole 3 is formed in the interior. Furthermore, in the cylinder housing 2, the connecting passage 8 on the primary side is pierced throughout the first housing block 21 and the second housing block 22, and in the first housing block 21, the connecting passage 9 on the secondary side is pierced. Both connecting passages 8, 9 have opening portions in the inner surface of the cylinder hole 3, and they can communicate with the unillustrated overhead reservoir.

Near the positions in front of the respective opening portions of the passages in the inner surface of the cylinder hole 3, cup seals 10, 11 are fitted, and by these cup seals 10, 11, the opening portions are sealed. In the cylinder housing 2, a piston guide 36 and a guide member 37 are arranged in series. The piston guide 36 is shaped like a cylinder, and the guide member 37 is shaped like a ring, and both of these are coaxially arranged in the cylinder housing 2.

Each of the primary piston 24 and the secondary piston 25 has a small outside diameter portion 28 whose outside diameter is reduced by forming the step surface 27, on the periphery of a part near the tip of a cylindrical portion 26 in the cylinder hole 3, and in the inner peripheral surface of a part deeper than the step surface 27, an engaging groove 39 (refer to FIG. 3) which is continuous along the circumferential direction is formed, and to the inner periphery of the position corresponding to the small outside diameter portion 28, a retainer 41 is mounted in such a way that slipping-off is prevented.

The sleeve 30 is shaped like a cylinder whose length is fitted to the length of the small outside diameter portion 28 and whose thickness is fitted to the size of the step of the step surface 27, and the outside diameter thereof is in accord with the outside diameter of the cylindrical portions 26 of the pistons 24, 25. Furthermore, the sleeve 30 has a radial passage groove 32 which exists at the end surface opposite to the step surface 27 and is formed along the radial direction, and an axial passage groove 33 which exists on the inner surface side and is formed along the axial direction, and each one is fitted and mounted onto the periphery of the small outside diameter portion 28 of each of the pistons 24, 25. The radial passage groove 32 continues long in the circumferential direction of the sleeve 30 throughout an angular range of about 45 degrees at four positions at equal angular intervals. The axial passage groove 33, whose position in the circumferential direction is fitted to that of the radial passage groove 32, follows after the radial passage groove 32. Accordingly, the sleeve 30 has ungrooved portions where neither the radial passage groove 32 nor the axial passage groove 33 exists at equal angular intervals at four positions.

Then, the sleeve 30 is fitted and mounted onto the periphery of the small outside diameter portion 28, and the size of the continuous length in the circumferential direction of the radial passage groove 32 is set larger than the size of the step of the step surface 27 or the size of the thickness of the small outside diameter portion 28, and the size of the depth of the axial passage groove 33 is set smaller than the size of the step, and it becomes possible to provide fluid communication between the respective corresponding pressure chambers 6, 7 and connecting passages 8, 9, by using the passage formed by the step surface 27 and the radial passage groove 32 and the passage formed by the peripheral surface of the small outside diameter portion 28 and the axial passage groove 33.

The retainer 41 is shaped like a cylinder, and at one end portion of the retainer 41 in the cylindrical portion 26 of each of the pistons 24, 25, a plurality of engaging claws 42 are projectingly provided in a state of being bent to the outside, and at the other tip portion coming out of the cylindrical portion 26, there are 4 pieces of slipping-off preventing pieces 43 which are formed in a way of being bent to the outside at equal angular intervals, and the engaging claws 42 are fitted into the engaging groove 39 in the cylindrical portion 26 so that the engaging claws 42 may be engaged with the cylindrical portion 26, and the slipping-off preventing pieces 43 cover the tip surface of the ungrooved portion to prevent the sleeve 30 from slipping off. The slipping-off preventing pieces 43 are facing to the tip surfaces of the piston 24 or 25 and the sleeve 30.

According to the above embodiment of the present invention, the size of the continuous length in the circumferential direction of the radial passage groove 32 is set larger than the size of the step of the step surface 27 or the size of the thickness of the small outside diameter portion 28 of the pistons 24, 25, and by using the passage formed by the step surface 27 and the radial passage groove 32 and the passage formed by the peripheral surface of the small outside diameter portion 28 and the axial passage groove 33, the pressure chambers 6, 7 and the respective corresponding connecting passages 8, 9 are communicated, and therefore, the resistance of flow from the reservoir to the pressure chambers 6, 7 can be reduced and the ineffective stroke can be reduced.

Furthermore, in the case of conventional communicating holes 12, 13, there has been a risk to hurt the cup seals 10, 11 by the edge of the opening portion of the hole, but in the case of a master cylinder 20 according to this embodiment, a roundness can easily be formed along the peripheral circumferential edge portion of the radial passage groove 32 or the peripheral cirumferential edge portion of the step surface 27, so that the cup seals 10, 11 may easily be prevented from being hurt. Moreover, since the perforating of the pistons 24, 25 becomes unnecessary, there is such an advantage that the processing of the pistons 24, 25 becomes easy and the cost reduction can be performed.

Figure 4:
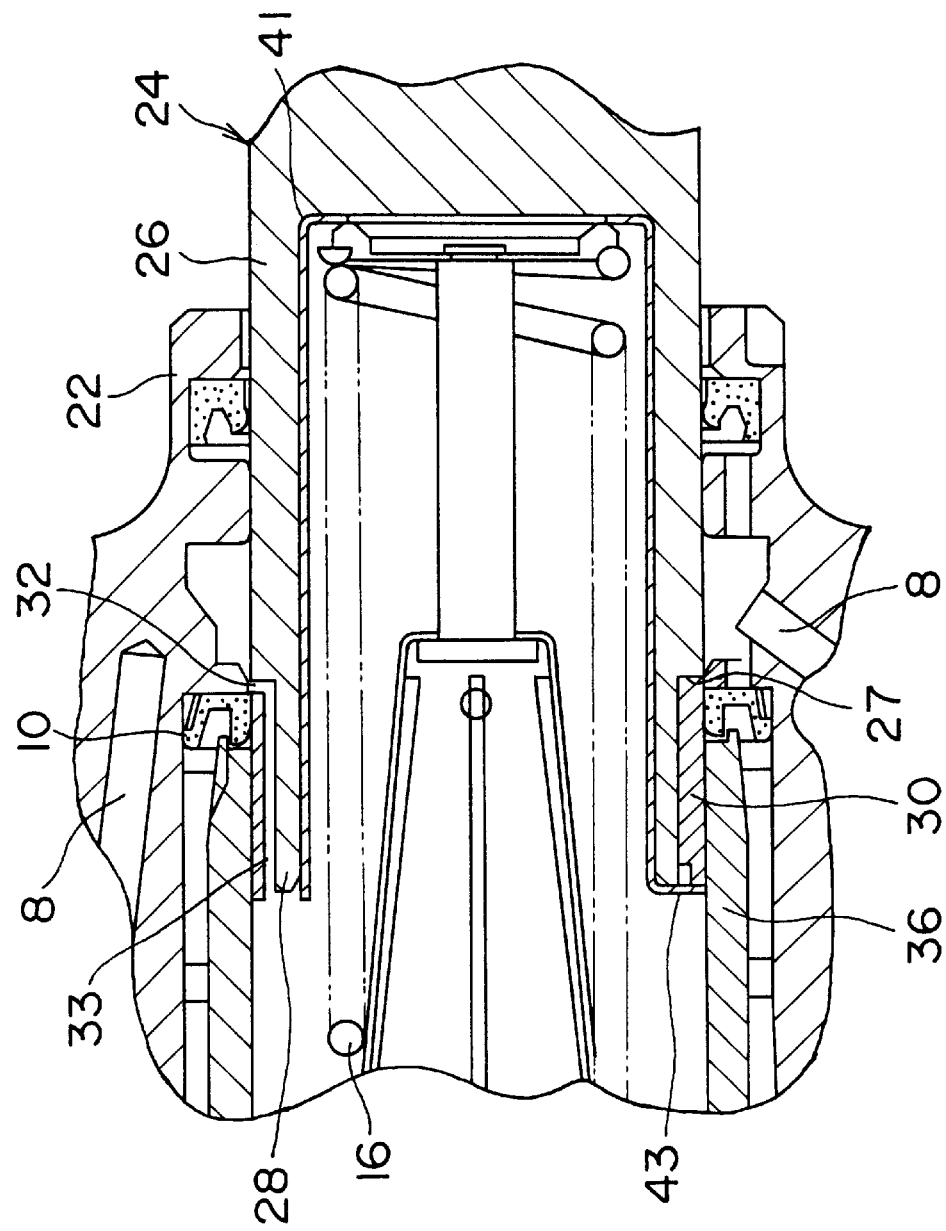
FIG. 4 is a longitudinal sectional view showing a master cylinder according to another embodiment of the present invention.

FIG. 4 is a longitudinal sectional view showing a master cylinder according to another embodiment of the present invention. According to the above embodiment, in the assembling of the sleeve 30 to the pistons 24, 25, the engaging claws 42 of the retainer 41 are inserted into the engaging groove 39 of the cylindrical portion 26, and the sleeve 30 is prevented from slipping off the small outside diameter portion 28 by the slipping-off preventing pieces 43 of the retainer 41, but in the master cylinder shown in FIG. 4, instead of this, the retainer 41 for preventing the sleeve 30 from slipping off is extended to the bottom portion in the depths of the cylindrical portion 26 of the piston 24, and the retainer 41 is pressed to the bottom surface of the piston 24 by the return spring 16, so that the sleeve 30 may be prevented from slipping off the piston 24.

By the way, the method to assemble the sleeve 30 to the pistons 24, 25 is not limited to the above methods, and for example, it is possible that the inner periphery of the sleeve 30 is fitted and fixed onto the periphery of the small outside diameter portion 28 of the piston 24 by pressing, or it is also possible that a caulking portion is provided at the tip of the small outside diameter portion 28 of the piston 24 and the caulking portion is caulked to fix the sleeve 30 to the piston 24 after the sleeve 30 has been fitted onto the small outside diameter portion 28. When doing so, the retainer 41 can be omitted and the sleeve 30 can more firmly be fixed to the piston 24. Moreover, it is preferable that the sleeve 30 and the piston 24 are coaxial and have the same outside diameter. Accordingly, in the case when an additional processing is performed after the sleeve 30 has been fixed to the piston 24 so as to make the sleeve 30 and the piston 24 coaxial and to make them have the same outside diameter, it is preferable to fix them firmly as mentioned above. In the case when the sleeve 30 is fixed to the secondary piston 25, the situation is the same.

By the way, the present invention is not limited to the above embodiments, and various modifications and changes are possible. For example, it is also possible that the radial passage groove 32 is provided in the step surface 27 of the pistons 24, 25 and the axial passage groove 33 is provided in the periphery of the small outside diameter portion 28 of the pistons 24, 25, and it is also possible that the radial passage groove 32 is provided in the pistons 24, 25 and the axial passage groove 33 is provided in the sleeve 30, and it is also possible that the radial passage groove 32 is provided in the sleeve 30 and the axial passage groove 33 is provided in the pistons 24, 25. Furthermore, the axial passage groove 33 may be a little slant relative to the axial direction.

What is claimed is:

1. A master cylinder comprising:

a cylinder housing which has a connecting passage connected to a reservoir and a piston which is freely slidable in a cylinder hole of the cylinder housing, said piston configuring a pressure chamber, the pressure chamber and the reservoir being in fluid communication through the connecting passage and a communicating hole provided on a portion of said piston, said portion comprising a reduced outside diameter portion defined by a radially inward step surface on the periphery of said piston, a sleeve fitted onto an outer periphery of said reduced outside diameter portion of said piston, wherein a radial passage groove is formed between a radial portion of said step surface of said piston and an end surface of said sleeve opposite to said radial portion of said step surface and an axial passage groove is formed between an inner surface of said sleeve and an outer peripheral surface of said reduced outside diameter portion of said piston and said axial passage groove intersects said radial passage groove whereby said communicating hole is formed by said radial passage groove and said axial passage groove.

2. The master cylinder according to claim 1, wherein the continuous length in the circumferential direction of said radial passage groove is set larger than, and the depth of said axial passage groove is set small than, the radial depth of said step surface.

3. A master cylinder according to claim 1, further comprising a holder for holding said sleeve onto the periphery of the reduced outside diameter portion of the piston.

4. A master cylinder according to claim 3, wherein the reduced outside diameter portion of the piston is formed on a tubular portion of the piston having an inner peripheral surface, and wherein the holder comprises a retainer inserted into a locking groove formed in said inner peripheral surface of the tubular portion of the piston, said retainer having a portion that extends radially outward over an end of the tubular portion of the piston and engages an end of the sleeve so as to prevent the sleeve from slipping off the piston.

5. A master cylinder according to claim 3, wherein the piston has an inner hole for receiving a return spring, and the holder comprises a retainer press fit into said inner hole of the piston, the retainer having a portion that extends radially outward over an end of the tubular portion of the piston and engages an end of the sleeve so as to prevent the sleeve from slipping off the piston.

6. A master cylinder according to claim 1, wherein the sleeve is press fit and adhesively bonded onto the reduced outside diameter portion of the piston.

* * * * *